United States Patent [19]

Lindfors

[11] 4,344,498

[45] Aug. 17, 1982

[54] AUTOMATIC STEERING MEANS FOR A DRIVERLESS CARRIAGE

[76] Inventor: Olof H. Lindfors, Vegagatan 32, S-413 09 Göteborg, Sweden

[21] Appl. No.: 107,601

[22] Filed: Dec. 27, 1979

[30] Foreign Application Priority Data

Jan. 2, 1979 [SE] Sweden .............................. 7900011

[51] Int. Cl.³ ............................................. B62D 1/28
[52] U.S. Cl. .................................... 180/168; 180/6.5; 180/131; 318/587
[58] Field of Search ............... 180/168, 167, 131, 197, 180/79, 6.5, 216; 318/587; 414/273; 46/261

[56] References Cited

U.S. PATENT DOCUMENTS

| | | | |
|---|---|---|---|
| 3,245,493 | 4/1966 | Barrett | 180/168 |
| 3,612,206 | 10/1971 | Ohntrup | 318/587 |
| 3,628,624 | 12/1971 | Wesner | 180/168 |
| 4,015,680 | 4/1977 | Pircher | 180/168 |
| 4,032,758 | 6/1977 | Lewis | 318/587 |
| 4,042,059 | 8/1977 | Bertolase | 180/79 |

FOREIGN PATENT DOCUMENTS

2443714  8/1980  France ................................ 180/168

Primary Examiner—David M. Mitchell

[57] ABSTRACT

A driverless carriage with automatic steering rendering the carriage capable of travelling in a straight line as well as performing a rotation about a vertical axis. To improve the precision of the turning movement, the carriage monitors during said movement the position, with reference to the surface on which the carriage moves, of the axis of rotation of the carriage. At least one measuring wheel engages the surface to detect a deviation of said vertical axis from a stationary position to produce a correction signal used for adjusting the steering of the carriage so as to eliminate the deviation of said vertical axis from the proper position.

6 Claims, 7 Drawing Figures

Fig. 5

AUTOMATIC STEERING MEANS FOR A DRIVERLESS CARRIAGE

FIELD OF THE INVENTION

This invention relates to the type of transport vehicles usually referred to as "driverless carriages" or "driverless trucks", that is, wheeled vehicles which do not run on rails or the like and require no driver. This type of vehicles is increasingly used for internal transports in workshops, warehouses etc.

BACKGROUND OF THE INVENTION

The driverless carriages now in use are arranged automatically to follow a path or circuit defined by stationary directors. The directors may, for instance, consist of electric guide cables sunk in the ground or floor, the magnetic field of which actuates a receiver on the carriage, or optical reflectors cooperating with optical path finders equipped with photocells on the carriage, or steel tapes arranged in or on the ground or floor cooperating with electromagnetic sensors on the carriages. A sideways deviation of the carriage from the path defined by the director causes the path finder to actuate the steering means of the carriage in the sense required to bring back the carriage to the predetermined path. The steering of the carriage may, for instance, be effected by means of one or more steering wheels angularly adjustable about a vertical axis, or by means of individual control of the drive of a pair of angularly nonadjustable driving wheels having a common geometrical axis (differential steering).

In existing systems, it sometimes happens that the carriage, on performing automatically a turn or change of direction, gets into a position which deviates so much from the predetermined path that the sensor or receiver of the carriage is out of feeling with the fixed directing means, an accident comparable to the derailment of a rail carriage. Accidents of this kind are particularly liable to occur on slippery spots in which the grip of the wheels on the ground or floor is inadequate to prevent slipping.

SUMMARY OF THE INVENTION

The invention is primarily directed to a device for automatically controlling the turning, or change of direction, of a driverless carriage, and has for its principal purpose to eliminate or substantially decrease the occurrence of accidents or disturbances of the kind referred to by means of apparatus for monitoring the angular movement of the carriage with respect to the ground or floor and for causing, on detecting a tendency of the carriage to deviate from a predetermined mode of angular movement, the steering means of the carriage to be operated so as to counteract the deviation.

A more special object of the invention is to render possible the use of a director system for driverless cars defining a path or circuit composed exclusively of straight, parallel and/or intersecting lines, that is, without any curved transitions between different parts of the path or circuit.

Still another object of the invention is the provision of control apparatus for a driverless carriage enabling the carriage to describe a predetermined path or itinerary with sufficient precision without the aid of fixed directors.

The invention is particularly defined in the appended claims.

DESCRIPTION OF THE DRAWINGS

In the following, embodiments of the invention are described by way of example with reference to the attached drawings in which.

DETAILED DESCRIPTION OF ILLUSTRATED EMBODIMENTS

Figure 1:
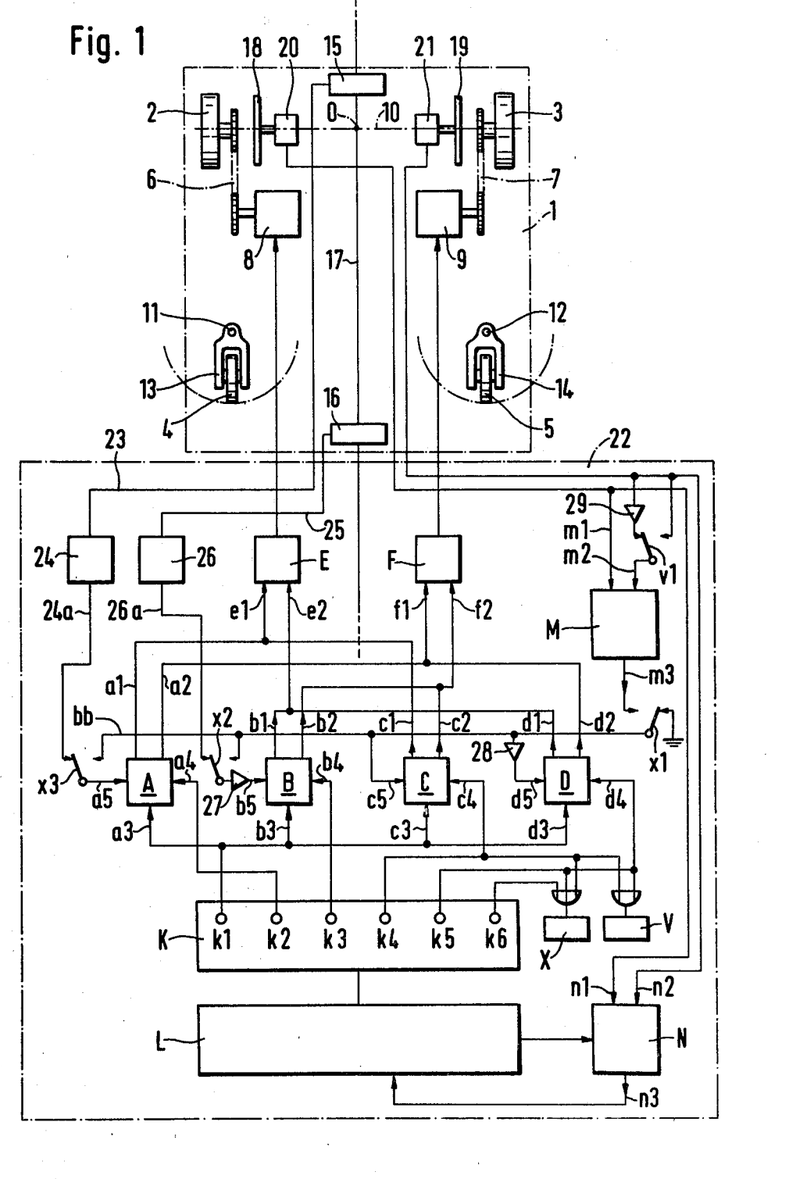
FIG. 1 is a schematic view of a carriage with a control unit according to the invention, the control unit being represented by a block diagram.

The carriage of FIG. 1 has a chassis 1 shown as an outline only supported by four wheels 2, 3, 4, 5. The front wheels 2, 3 have a fixed direction with respect to the chassis and a common geometrical axis 10. Each of the front wheels 2, 3 is arranged to be driven by a driving unit 8, 9, respectively, through a transmission 6, 7, respectively. Each of the rear wheels 4, 5 is supported by a wheel fork 13, 14 pivotable about a vertical axis 11, 12 respectively, so that the rear wheels can freely adjust themselves to changes of the direction of the carriage. The chassis is provided with a front and a rear path finder device 15, 16, respectively, which cooperates with fixed directing means, for instance an electric cable 17 sunk in the floor. The front path finder 15 is arranged to serve during the forwards displacement of the carriage, and the rear path finder 16 is arranged to serve during displacement backwards of the carriage. A pair of measuring wheels 18, 19, which are rotatable independently of each other by their engagement with the ground or floor, are provided between the driving wheels 2, 3, said measuring wheels having a common geometric axis parallel to and lying in the same vertical plane as the geometric axis 10 of the driving wheels 2, 3. Each of the measuring wheels 18, 19 drives a measuring signal generator 20, 21, respectively.

The carriage is provided with a control unit denoted as a whole by the numeral 22. Said unit comprises an operating signal transmitter E, F, respectively, for each of the driving means 8, 9, as well as the electronic equipment required for controlling said operating signal transmitters. Each of the operating signal transmitters E, F has two input terminals e1, e2 and f1, f2 respectively. The presence of a signal on the input terminal e1, f1, will cause the operating signal transmitter E, F, respectively, to transmit the signal FORWARD to the driving unit 8, 9, respectively. The presence of a signal on the other input terminal e2, f2 will cause the transmitter E, F, respectively, to transmit the signal BACK to the driving unit 8, 9 respectively. The driving units 8, 9 are arranged to drive their respective wheels 2, 3 with a speed determined by the level of the signal transmitted by the transmitter E, F, respectively. The equipment for controlling the transmitters E, F comprises four control units A, B, C, D the input terminals a4, b4, c4, d4 of which are connected to the output terminals k2, k3, k4, k5 of an order unit K arranged to render one at a time of the control units A, B, C, D active by the transmission of a signal through the corresponding output terminal. Each of said control units is provided with two output terminals a1, a2, b1, b2, c1, c2, d1, d2, respectively, for the supply to the input terminals e1, e2 and f1, f2 of the operating signal transmitters E, F of the control signal combinations required for causing said transmitters to transmit signals corresponding to the operations PROGRESSION FORWARDS (control unit A), PROGRESSION BACKWARDS (control unit B), CLOCKWISE TURN (control unit C) and COUNTERCLOCKWISE TURN (control unit D). When for instance the control unit A is activated by a signal from the output terminal k2 of the order unit K, the control unit A produces a signal on both its output terminals a1, a2. Said terminals are connected with the input terminals e1, f1, respectively, of the operating signal transmitters E and F and cause each of said transmitters to transmit an operating signal FORWARD to the corresponding driving unit 8, 9, causing the driving units to drive the wheels 2, 3 in the forwards direction. A fifth output terminal k1 of the order unit K is the carrier of a signal corresponding to a desired rate of speed. This signal is supplied to input terminals a3, b3, c3, d3 of the central units A, B, C, D and determines the level of the signals transmitted through the output terminals of the active control unit and thence the level of the signals transmitted by the operating signal transmitters E, F to the driving units 8, 9 to make the driving units drive the wheels 2, 3 at the desired rate of speed.

Each of the control units A, B, C, D has an additional input terminal a5, b5, c5, d5 for a correcting signal for modifying the level of the signals emitted by the control units through the output terminals a1, a2, b1, b2, c1, c2, d1, d2, respectively. More particularly the presence of a positive signal voltage on the input terminal a5 of the control unit A, when activated by a signal from the output terminal k2 of the order unit K, results in a decrease of the level of the signal emitted through the output terminal a1 of the control unit A by an amount corresponding to the level of said positive signal voltage, but causes no change of the level of the output signal emitted through the output terminal a2 of the control means. The presence of a negative signal voltage on the input terminal a5 of the control unit A results in a decrease of the level of the output signal emitted through the output terminal a2 of the control unit, but causes no change of the level of the output signal emitted through the output terminal a1 of the control unit. The other control means B, C, and D are arranged to be controlled in a similar manner by their inputs b5, c5, d5, respectively.

The means for the production of said correcting signals and for their supply to the input terminals a5-d5 of the control units A-D will now be described.

The pathfinder element 15 is connected to an amplifier device 24 through a signal cable 23. The output terminal 24a of said amplifier device carries a correcting signal the polarity and level of which are dependent on the deviation sensed by the pathfinder 15 towards one side or the other of the path determined by the director 17. In the nonoperated state of a relay X, its change-over contact x3 connects the output terminal 24a with the input terminal a5 of the control unit A. The relay X is arranged to operate when a signal voltage is present on any of the output terminals k4, k5 of the order unit K or on a sixth output terminal k6, the function of which will be explained below.

The pathfinder element 16 is connected to an amplifier device 26 through a signal cable 25. The output 26a of said amplifier device carries a correcting signal the polarity and level of which are dependent upon the deviation sensed by the pathfinder element 16 towards one side or the other of the path predetermined by the director 17. In the nonoperated state of the relay X, its change-over contact x2 connects the output terminal 26a with the input terminal b5 of the control unit B via a polarity inverter 27.

The measuring signal generator 20 is connected with one input m1 of a comparator M. In the nonoperated state of a relay V, its change-over contact v1 connects the measuring signal generator 21 to the second input terminal m2 of the comparator M via a polarity inverter 29. In the operated state of the relay V (the function of which will be explained below) the contact v1 directly connects the measuring signal generator 21 with said second input terminal m2. In the operated state of relay X, its change-over contact x1 connects the output terminal m3 of the comparator M to a signal conductor bb. This signal conductor can be connected to the input a5 of the control unit A through the change-over contact x3 in its operated position, and can be connected to the input b5 of the control unit B through the change-over contact x2 in its operated position in series with the polarity inverter 27. Moreover, the signal conductor bb is permanently connected with the input c5 of the control unit C, and also connected with the input terminal d5 of the control unit D, in series with a polarity inverter 28.

Each of the measuring signal generators 20, 21 is arranged to produce a measuring signal proportional to the speed at which the corresponding measuring wheel 18, 19, respectively, rotates, said signal being positive when the wheel rolls forwards, and negative when the wheel rolls backwards.

The relay V is arranged to be energized, when a signal is transmitted on any of the output terminals k4 and k5 of the order unit K, that is, when the carriage is to perform a turn (a clockwise turn for a signal on terminal k4, a counterclockwise turn for a signal on terminal k5). The comparator M is arranged to produce a signal proportional to the difference between the measuring signal supplied to the input terminals m1, m2, the resulting signal supplied to the output terminal m3 being positive when the positive measuring signal supplied to the comparator exceeds the negative measuring signal. Moreover, each of the two measuring signal generators 20, 21 is connected to one of the input terminals n1, n2 of an integrator or meter N arranged to produce an output signal proportional to the sum of the distances travelled by the measuring wheels 18, 19. By means of control pulses from the address unit L, the integrator or meter N can be adapted either to compute the distance travelled by the carriage (when the carriage moves forwards or backwards) or to compute the angle of rotation described by the carriage (when the carriage turns) and can also be zeroized before the starting of an operation. The output signal is supplied through the output terminal n3 of the device N to the address unit L. The address unit L is provided with a comparator for comparing said output signals with prescribed values of the length of travel and the angle of rotation previously entered into the address unit. The address unit is also provided with means controlled by said comparator arranged to cause the order unit to stop further displacement or rotation of the carriage as soon as the actual value supplied by the device N agrees with the prescribed value.

The operation of the equipment described above will now be described.

Forwards movement controlled by a director.

The order unit impresses a signal on its output terminals k1 and k2. The signal on the output terminal k2 activates the control unit A, causing said unit to impress on each of its output terminals a1, a2 a control signal the level of which is determined by the speed setting signal supplied by the output terminal k1 of the order unit K to the input terminal a3 of the control unit A. The control signals on the output terminals a1, a2 are supplied to the input terminals e1, f1, respectively, of the operation signal transmitters E, F. The operation signal transmitters E, F are thereby caused to transmit an operation signal FORWARDS, which is supplied to the driving units 8, 9, respectively, causing the driving units to drive their respective wheels 2, 3 in forwards direction with a speed corresponding to the speed setting signal. The pathfinder device 15 produces no signal as long as it is in a correct position with respect to the cable 17. A deviation from the correct position causes the pathfinder device to produce a signal, which is supplied to the input terminal a5 of the control unit A through the output terminal 24a of the amplifier 24 and the switch-over contact x3 in the rest position. A deviation to the right results in a positive signal, a deviation to the left in a negative signal on the input terminal a5. Let it be assumed that a deviation to the right is occurring, resulting in a positive correcting signal on the input terminal a5. As explained above, this signal results in a decrease of the level of the signal impressed on the output terminal a1 of the control unit A by an amount corresponding to the level of the correcting signal, while the level of the signal on the output terminal a2 is not changed. The decrease of the level of the control signal supplied to the operating signal transmitter E through its input terminal e1 results in a corresponding change of the operating signal transmitted by the operating signal transmitter E, so that the driving unit 8 is caused to drive the wheel 2 with a speed lower than the one of the wheel 3. This will cause the front end of the carriage and the pathfinder 15 to move leftwards towards the proper position. Consequently, the signal produced by the pathfinder device 15 successively drops and will be restored to zero, when the pathfinder device regains the correct sideways position with reference to the cable 17.

Backwards movement controlled by a director.

The order unit K impresses a signal on its output terminals k1 and k3. The signal on the output terminal k3 activates the control unit B, causing said unit to impress on each of its output terminals b1, b2 a signal the level of which is determined by the speed setting signal supplied by the output terminal k1 of the order unit K to the input terminal b3 of the control unit B. The control signals on the output terminals b1, b2 are supplied to the input terminals e2, f2, respectively, of the operation signal transmitters E, F. Both of the operation signal transmitters E, F are thereby caused to transmit the operation signal BACKWARDS to the driving units 8, 9, respectively, causing the driving units to drive their respective wheels 2, 3 in the backwards direction with a speed corresponding to the speed setting signal. Any deviation from the correct position with respect to the cable 17 causes the pathfinder device 16 to produce a signal, which is supplied to the input terminal b5 of the control unit B through the output terminal 26a of the amplifier 26, the switch-over contact x2 in the rest position, and the inverter 27. The pathfinder device 16 is so arranged that a deviation to the right (in FIG. 1) produces a negative signal and a deviation to the left a positive signal on the output terminal 26a. The inverter 27 causes the signals to be supplied to the input terminal b5 with reversed polarity. For instance, a deviation to the right in the figure results in the impression of a positive correction signal on the input terminal b5. This signal results in a decrease of the level of the signal impressed on the output terminal b1 of the control unit B by an amount corresponding to the level of the correcting signal, while the level of the signal on the output terminal b2 is not changed. The decrease of the level of the control signal supplied to the operation signal transmitter E through its input terminal e2 results in a corresponding change of the operating signal transmitted by the operation signal transmitter E, so that the driving means 8 is caused to drive the wheel 2 with a reduced speed. This will cause the rear end of the carriage and the pathfinder device 16 to move leftwards towards the proper position. Consequently, the signal produced by the pathfinder device 16 successively drops and will be restored to zero when the pathfinder is again properly centred with respect to the cable 17.

Forwards movement without the aid of a director

The order unit K impresses a signal on its output terminals k1, k2, and k6. The signal on the output terminal k6 energizes the relay X which operates its change-over contacts x1, x2, and x3. The signal on k2 causes, as described above, the signal FORWARDS to be transmitted by both the operation signal transmitters E, F, whereby both of the driving units 8, 9 are caused to drive their respective wheels 2, 3 in the forwards direction, so that both of the measuring signal generators driven by said wheels will generate a positive signal. The inverter 29 causes the signal from the measuring signal generator 21 to be supplied to the comparator M with negative polarity. As long as the carriage is moving in a straight path, the measuring wheels 18 and 19 will roll at equal speeds. The signals supplied to the input terminals m1 and m2 of the comparator will then be equal and opposed, and no signal will be transmitted by the output terminal m3 of the comparator. If, however, the carriage moves in a curved path, one measuring wheel will roll at a swifter rate than the other, causing the algebraic sum of the signals supplied to the comparator M to differ from zero. Consequently, a correcting signal will appear on the output terminal m3 of the comparator. Said correcting signal is supplied to the input terminal a5 of the control unit A through the operated switch-over contacts x1, x3. Let it, for instance, be assumed that the carriage during its travel forwards deviates to the right from the original direction, causing the measuring wheel 18 to rotate more rapidly than the measuring wheel 19, with the result that the magnitude of the positive signal supplied to the input terminal m1 of the comparator exceeds the magnitude of the negative signal supplied to the input terminal m2. The comparator will then produce a positive correcting signal the magnitude of which corresponds to the difference between the input signals. The supply of said correcting signal to the input terminal a5 of the control unit A results, as described above, in a decrease of the level of the operating signal transmitted by the operating signal transmitter E, so that the driving means 8 is caused to drive the wheel 2 at a reduced speed. This reduction of speed will be maintained until both the measuring wheels again rotate with equal speeds.

Backwards movement without the aid of a director

The order unit K impresses a signal on each of its output terminals k1, k3, and k6. The signal on the terminal k6 energizes the relay X, which operates its change-over contacts x1, x2, and x3. The signal on the output terminal k3 causes, as described above, each of the two operation signal transmitters E, F to supply the operating signal BACKWARDS to the driving unit 8, 9, respectively, causing the driving units to drive their respective wheels in backwards direction at a speed corresponding to the speed setting signal transmitted by the output terminal k1 of the order unit K. The corresponding backwards rotation of both of the measuring wheels 18, 19 causes both of the measuring signal generators to produce negative signals. The inverter 29 causes the signal produced by one measuring signal generator 21 to be supplied to the input terminal m2 of the comparator as a positive signal. Let it, for instance, be assumed that the carriage during its movement backwards tends to turn to the right in the figure, that is, to describe a curved path, the concave side of which is to the right in the figure. The measuring wheel 18 will then rotate at a swifter rate than the measuring wheel 19, causing the magnitude of the negative signal on the input terminal m1 of the comparator M to exceed the magnitude of the positive signal on the input terminal m2. The comparator accordingly produces a negative correcting signal which is transmitted from the output terminal m3 through operated contacts x1 and x2 and the inverter 27 to the input terminal b5 of the control unit B. The inverter 27 causes the signal to be supplied to the terminal b5 with reversed, that is, positive polarity. This positive correcting signal effects, in the way already described above, a reduction of the speed at which the wheel 2 is driven by the driving means 8. This reduction of speed will equalize the speeds of the measuring wheels, causing the output signal of the comparator to drop to zero.

Clockwise turn

The order unit K impresses a signal on each of its output terminals k1, k4, and k6. The relays X and V are energized. The relay X operates its change-over contacts x1, x2, and x3. The relay V operates its contact v1 into the working position, causing the signal generator 21 to be directly connected to the input terminal m2 of the comparator M. The signal on the output terminal k4 is supplied to the input terminal c4 of the control unit C. The output terminal c1 of the thus activated control unit C supplies a control signal to the input terminal e1 of the operation signal transmitter E, causing the transmission of an operating signal FORWARDS to the driving unit 8. The signal makes the driving unit turn the wheel 2 in the forwards direction at a speed determined by the speed setting signal supplied by the output terminal k1 of the order unit K. The output terminal c1 of the control unit C supplies a control signal to the input terminal f2 of the operation signal transmitter F, resulting in the transmission of an operating signal BACKWARDS to the driving unit 9. The signal makes the driving unit turn the wheel 3 in backwards direction at a speed determined by the speed setting signal supplied through the output terminal k2. The carriage performs a clockwise rotation. The measuring wheels 18, 19 are caused by their engagement with the ground or floor to rotate forwards and backwards, respectively. Consequently, the measuring signal generator 20 produces a positive signal and the measuring signal generator 21 produces a negative signal, said signals being supplied to the input terminals m1, m2, respectively, of the comparator. As long as the vertical axis of rotation of the carriage remains located at the middle point 0 between the measuring wheels 18, 19, these signals have the same magnitude, so that no signal is supplied to the output terminal m3 of the comparator M. If, however, the speeds of the wheels 2, 3 with respect to the ground are not equal, for instance if one wheel is skidding or has a smaller diameter than the other wheel, the axis of rotation of the carriage will be located closer to the slower wheel than to the more rapidly moving wheel. Consequently, the speeds of the measuring wheels 18, 19 and the magnitudes of the signals generated by the measuring signal generators 20, 21 will deviate from each other, causing a difference signal to be supplied to the output terminal m3 of the comparator M. Let it be assumed, for instance, that the driving wheel 2 moves slower along the ground than the driving wheel 3, and that, consequently, the measuring wheel 18 rotates slower than the measuring wheel 19. The magnitude of the negative signal generated by the measuring signal generator 21 will then exceed the magnitude of the positive signal generated by the measuring signal generator 20, with the result that the comparator M will supply a negative correcting signal to its output terminal m3. This output signal is supplied to the input terminal c5 of the control unit C via the operated contact x1 and the signal conductor bb. Said negative correcting signal effects a reduction of the magnitude of the signal transmitted by the output terminal c2 of the control unit C and supplied to the input terminal f2 of the operation signal transmitter F. The resulting modification of the operating signal transmitted by the operation signal transmitter F causes the driving unit 9 to drive the wheel 3 with a reduced speed, whereby the axis of rotation of the carriage with respect to the ground is restored to the correct position 0 in the middle between the measuring wheels.

Counterclockwise turn

The order unit impresses a signal on its output terminals k1, k5, and k6. The relays X and V are energized and operate their change-over contacts x1, x2, x3, and v1. The signal on the output terminal k5 is supplied to the input terminal d4 of the control unit D and activates the control unit D. The output terminal d1 of the control unit D supplies a control signal to the input terminal e2 of the operating signal transmitter E, causing said transmitter to transmit the operating signal BACKWARDS to the driving unit 8, which is caused thereby to turn the wheel 2 in the backwards direction with a speed determined by the speed setting signal supplied by the output terminal k1 of the order unit K. The output terminal d2 of the control unit D supplies a control signal to the input terminal f1 of the operation signal transmitter F, causing said transmitter to transmit the operating signal FORWARDS to the driving unit 9, which is caused thereby to drive the wheel 3 in forwards direction with a speed determined by the speed setting signal supplied by the output terminal k1 of the order unit K. The described operation of the wheels results in a counterclockwise rotation of the carriage on the ground. The engagement of the measuring wheels 18, 19 with the ground causes them to rotate backwards and forwards, respectively. If for some reason the vertical axis of rotation of the carriage with respect to the ground should deviate from the proper position 0 in the middle between the measuring wheels, the speeds of the measuring wheels and, consequently, the magnitudes of the signals generated by the measuring signal generators 20, 21 will deviate from each other, so that a differential signal will appear on the output terminal m3 of the comparator. Let it, for instance, be assumed that the wheel 2 for some reason, for instance skidding, progresses slower along the ground than the wheel 3, resulting in the axis of rotation of the carriage being shifted towards the wheel 2. The measuring wheel 18 then will rotate slower than the measuring wheel 19. Consequently, the positive signal generated by the measuring signal generator 21 will exceed the negative signal generated by the measuring signal generator 20. The comparator M therefore will produce a positive correcting signal having a level corresponding to the difference between the magnitudes of the signals supplied to the input terminals of the comparator. Said positive correcting signal is supplied from the output terminal m3 through operated contact x1 and the signal conductor bb to the inverter 28, by which the signal is transmitted as a negative signal of the same magnitude to the input terminal d5 of the control unit D. Said negative signal effects a reduction of the level of the signal impressed on the output terminal d2 of the control unit D and supplied to the input terminal f1 of the operation signal transmitter F. The resulting modification of the operating signal transmitted by the operation signal transmitter causes the driving unit to drive the wheel 3 with a reduced speed. As a result, the axis of rotation of the carriage with respect to the ground is restored to the proper position 0 in the middle between the measuring wheels.

The advantage of the system described resides therein that the carriage on completion of a direction changing operation has a well-defined position with respect to the starting position before the change of direction. This facilitates any handling or treatment of the goods carried which may be scheduled to take place in the new position of the carriage; also the improved precision reduces the risk of the pathfinder device of the carriage getting out of touch with the director provided for the subsequent displacement of the carriage, resulting in a deviation of the carriage from the proper path. Another advantage resides in the capacity of the carriage to proceed along one or several predetermined straight path elements without the aid of directors.

Figure 2:
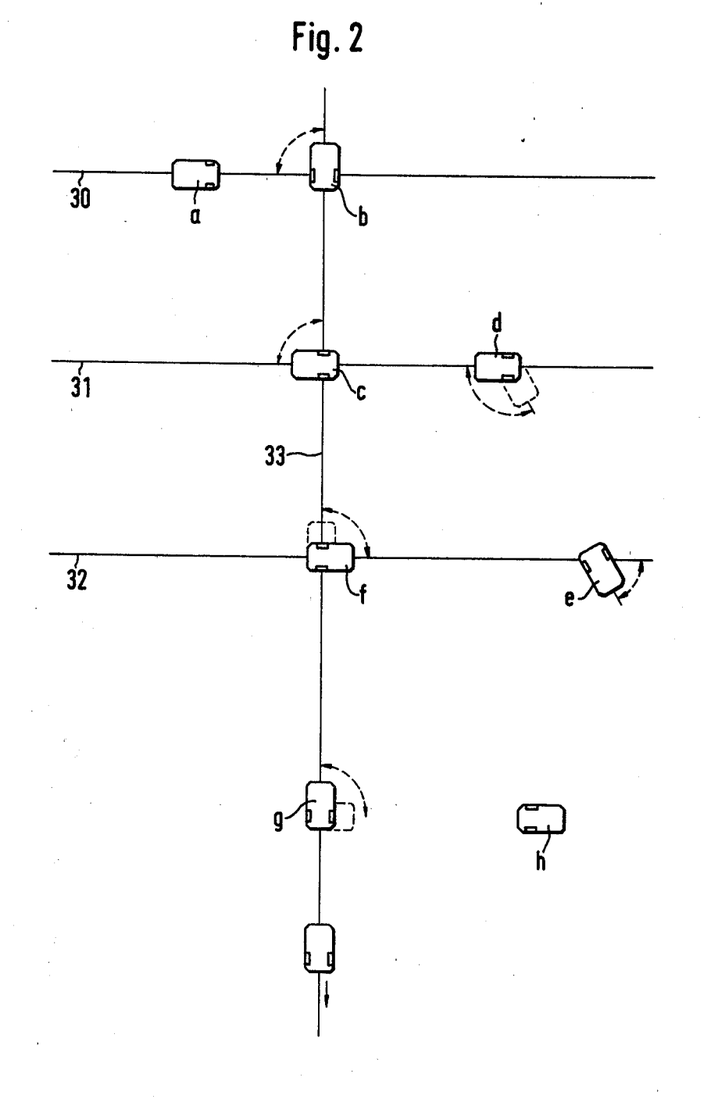
FIG. 2 shows a car according to FIG. 1 in a plurality of successive positions along a path composed of several straight elements, FIGS. 3 and 4 each represent one variant of the carriage of FIG. 1.

FIG. 2 illustrates an example of a path or itinerary composed of a plurality of elements for a carriage equipped with a control equipment according to the invention. The carriage operates on a floor provided with four straight directing cables three of which 30, 31, 32 are parallel to each other while the fourth cable 33 extends at right angles to the other cables. In the position a the carriage is moving forwards along the directing cable 30. When encountering the directing cable 33, the carriage is stopped, rotated clockwise by means of its driving wheels through an angle of 90° to the position b. The carriage then proceeds along the cable 33 until encountering the cable 31, where it is stopped and turned in counterclockwise direction to the position c. From position c, the carriage proceeds a predetermined distance along the directing cable 31 to the position d, in which it is rotated counterclockwise through an angle of approximately 120° and subsequently is caused to proceed in a straight line towards the directing cable 32, where it is stopped in the position e, rotated counterclockwise through an angle of about 60° and then caused to proceed along the directing cable 32 to its intersection with the directing cable 33, where the carriage is stopped in position f and rotated counterclockwise through 90°. the carriage is then caused to proceed forwards along the directing cable 33 to the position g, rotated clockwise through 90°, caused to proceed backwards at right angles to the directing cable 33 until arriving to position h, and then caused to return to the directing cable 33, rotated counterclockwise through 90° into position g and finally caused to drive away along the directing cable 33. This sequence of operations is effected by signals on the output terminals of the order unit K, as previously described. The order unit is again controlled by an address unit L, which determines the choice of, the timing of, and the duration of the successive signals to be transmitted by the order unit, said address unit being arranged to be governed by data stored in the address unit as well as by order impulses received during the travel of the carriage from control members arranged at certain points along the carriage path. According to an advantageous further development of the invention the measuring wheels 18, 19 and their measuring signal generators 20, 21 are utilized also for feeding back signals to the address unit indicating the distance travelled and the angle of rotation performed, said signals being compared with predetermined magnitudes stored in the memory of the address unit. These signals are produced by the integrator or meter N previously referred to. Said integrator device N computes a magnitude equal to or proportional to the sum of the distances covered during a displacement operation or a turning operation by the measuring wheels 18 and 19. Said magnitude is successively fed into the address unit L and compared in a comparator provided therein with a predetermined magnitude for the length of travel or the turning angle stored in the address unit. As soon as the values or magnitudes compared are found to be equal, the order unit K is caused to be actuated in such a manner that the displacement or rotation of the carriage is discontinued.

The measurement of the distance of travel and the turning angle can be performed also by an integrator N supplied with the output of one only of the measuring signal generators 20, 21. The utilization of both of the measuring signal generators provides, however, the advantage of a somewhat improved precision of measurement, as measuring errors of the two measuring wheels to a certain degree compensate each other.

When proceeding according to FIG. 2, the carriage moves from the position g to the position h and back without the aid of a fixed director. Due to the facts that the starting position for this displacement is very accurate and that the straightness of the path during the displacement being monitored by means of the previously described device according to the invention, the precision of the displacement of the carriage is sufficient in spite of the absence of a fixed director. It is even possible to have the carriage operate entirely without the aid of fixed directors. The driving program, including the distances of the successive straight travelling sections, and the angles of the turns (if any) to be performed at chosen points of the path or circuit is represented by data fed into and stored in the address unit and successively compared with the actual values or magnitudes fed into the address unit by the integrator N.

Figure 3:
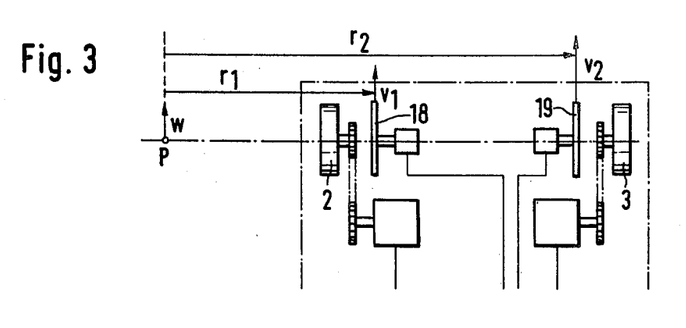

In the description of the embodiment according to FIG. 1, it was assumed that the desired position of the vertical turning axis is at the middle point 0 between the driving wheels 2, 3 and that also the measuring wheels 18, 19 are symmetrically arranged with respect to the point 0. The described arrangement can, however, be utilized for the monitoring and control of the turning of the carriage also for other locations of the vertical turning axis. In FIG. 3, where the numerals 2, 3, and 18, 19 denote the same parts as in FIG. 1, it is assumed that the desired vertical turning axis of the carriage intersects the geometrical axis of the driving wheels 2, 3 in a point P outside of the left driving wheel 2. To make the turning axis remain stationary at the point P, the driving wheels 2 and 3 have to roll in the same direction and with speeds proportional to their horizontal distance from the point P. If the speeds with which the measuring wheels 18, 19 roll on the ground are denoted $v_1$ and $v_2$ and their distances from the point P is denoted with $r_1$ and $r_2$, respectively, the following condition must be established:

$$v_1/v_2 = r_1/r_2.$$

If the speeds of the driving wheels do not fill the condition above referred to, for instance owing to skidding of one of the driving wheels, the axis of rotation will deviate from the point P, whereby the speeds $v_1$ and $v_2$ of the measuring wheels do not satisfy the above formula. Between the speed of displacement w of the actual turning axis and the speeds $v_1$, $v_2$ of the measuring wheels 18, 19, there is the following relation:

$$w = (v_1 r_2 - v_2 r_1)/(r_2 - r_1).$$

Consequently, the comparator M (FIG. 1) must in this case be arranged to compute an output signal the magnitude of which is proportional to the difference $v_1 r_2 - v_2 r_1$ (or the difference $(v_1/r_1) - (v_2/r_2)$, or the difference $v_1 - v_2 \cdot (r_1/r_2)$). This result can be obtained, for instance, by multiplying the output signal of one of the measuring signal generators by a correspondingly chosen factor before supplying it into the comparator.

Figure 4:
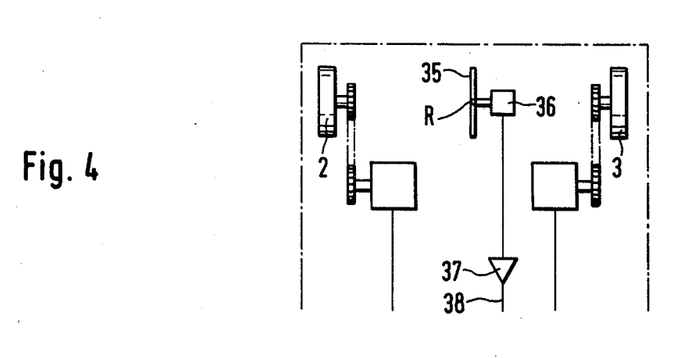

The device according to FIG. 4 differs from the one illustrated in FIG. 1 in that the carriage is provided with one measuring wheel 35 only. Said wheel drives a measuring signal generator 36, which through an amplifier 37 supplies a positive signal to a signal conductor 38, when the measuring wheel 35 rolls in the forwards direction, and a negative signal, when the measuring wheel 35 rolls in the backwards direction. When the measuring wheel is standing still, no signal is transmitted. The signal conductor 38 is connected with the control units C and D (FIG. 1) instead of the output terminal m3 of the comparator M. The device tends to maintain the vertical axis of rotation of the carriage stationary with respect to the ground or floor, said stationary position coinciding with the point R at which the measuring wheel contacts the ground or floor. The monitoring action is similar to the one of the device of FIG. 1. Of course, the measuring wheel 35 cannot, as the pair of measuring wheels of FIG. 1, be utilized for measuring the turning angle of the carriage or for the correcting of its deviation from a straight path.

Figure 5:
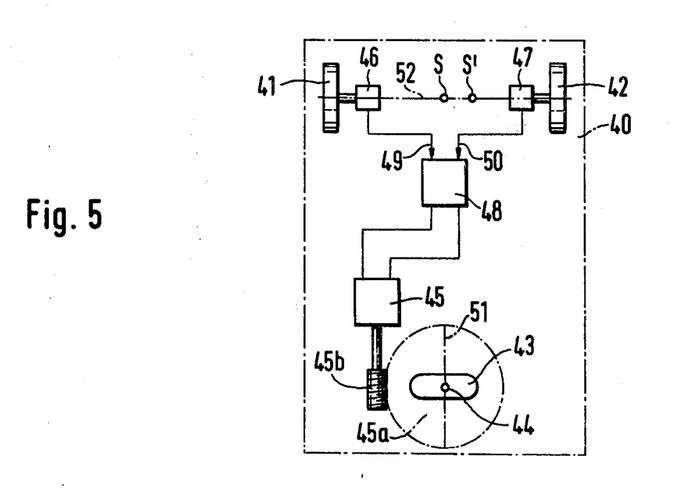
FIG. 5 is a schematic view of a carriage of a type different from the one of FIG. 1.

FIG. 5 schematically illustrates a carriage 40 having two supporting wheels 41, 42, which can rotate freely independently of each other, said wheels having a common geometrical axis 52, and a driving wheel 43. The driving wheel together with its driving mechanism (not shown) is pivotable about an axis 44 and can be rotated about said axis by means of a worm wheel 45a and a worm gear 45b forming part of a steering gear 45 arranged to be actuated by means of signals from a control unit 48. Each of the two supporting wheels 41, 42 is connected to a measuring signal generator 46, 47. Each of said generators is connected to one input terminal 49, 50 of the control unit 48.

In the case shown, the driving wheel is set in a position in which its geometrical axis 51 forms right angles with the geometrical axis 52 of the supporting wheels 41, 42 and crosses this axis 52 at the middle between the supporting wheels at S. The driving wheel 43 then tends to turn the carriage 40 about a vertical axis through the point S, in which case the wheels 41, 42 will rotate in opposite directions with equal angular speeds, and the measuring signal generators 46, 47 driven by these wheels will produce signals of equal magnitudes. These signals are supplied to a comparator provided in the control unit 48 and arranged to produce an output signal corresponding to the difference between the input signals. Said output signal controls the steering gear. When the carriage rotates about the vertical axis through S, the input signals are equal, and there is no output signal. If, however, the axis of rotation happens to be shifted away from S towards one of the supporting wheels 41 or 42, this wheel rotates slower than the other wheel, so that there will be a difference between the input signals to the control unit 48. The resulting output signal of the comparator of the control unit 48 causes the steering gear 45 to change the setting of the wheel 43 in the direction required for restoring a correct position of the pivoting axis. Let it, for instance, be assumed that the axis of rotation has been shifted towards the wheel 41, from which it follows that this wheel now rotates slower than the wheel 42. The resulting difference signal transmitted by the control unit 48 causes the steering gear to rotate the driving wheel 43 somewhat in clockwise direction about the vertical axis. This angular adjustment of the driving wheel temporarily shifts the intersection between the geometrical axis of the wheel 43 and the geometrical axis 52 of the supporting wheels 41, 42, for instance to the point S'. The wheel 43 now will tend to make the supporting wheel 41 rotate at a swifter rate than the supporting wheel 42. The angular displacement of the driving wheel 43 from the normal turning position remains, until the wheels 41, 42 rotate at the same rate, making the corresponding measuring signals equal.

In FIG. 5 the circuitry necessary for the steering of the carriage during travel forwards or backwards, as well as the address unit and order unit operating in the same manner as in the embodiment according to FIG. 1, are not shown, as they are not required for the explanation of the system for control of the turning operation.

In FIG. 5 the wheels 41, 42 serve both as supporting wheels for the carriage and as measuring wheels. It is possible in addition to the supporting wheels 41, 42 to arrange a separate pair of measuring wheels, each of which operates one measuring signal generator, as in the device according to FIG. 1. This may provide the advantage of a somewhat improved measuring precision.

Figure 6:
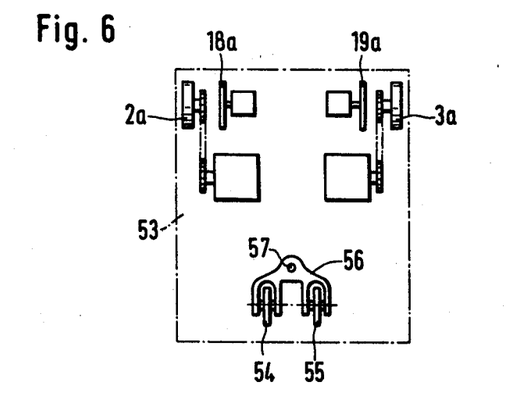
FIG. 6 shows a modified form of the carriage of FIG. 1.

In the device according to FIG. 6, the arrangement and the working of the supporting wheels 2a, 3a and the measuring wheels 18a, 19a correspond to those of the wheels 2, 3, 18 and 19 of FIG. 1. The individually pivotable supporting wheels 4, 5 of FIG. 1 are replaced by a pair of supporting wheels 54, 55 supported by a common wheel holder 56 arranged to pivot freely about a vertical axis 57. It is also possible instead to replace the pair of pivotably supported wheels by one single, pivotably supported wheel.

Figure 7:
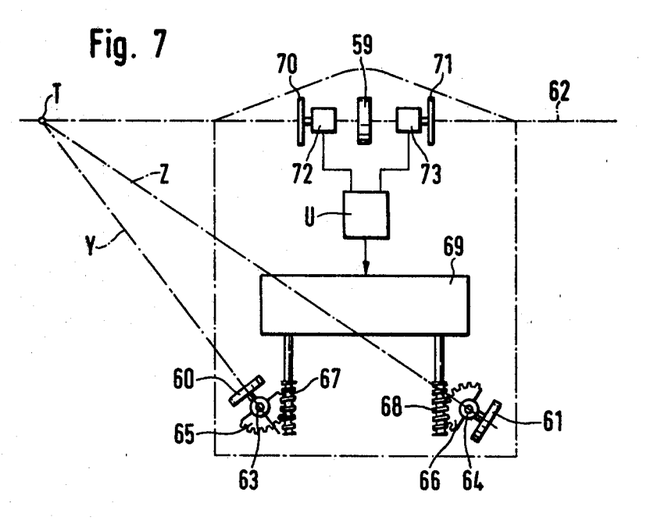
FIG. 7 shows still another type of a carriage provided with apparatus according to the invention for controlling the turning of the carriage.

In the device according to FIG. 7, the carriage 74 is provided with three supporting wheels 59, 60, 61. The supporting wheel 59 is mounted at one end and the wheels 60, 61 at the other end of the carriage. The wheel 59 has a fixed direction, its geometrical axis 62 extending at right angle to the longitudinal axis of the carriage. The wheels 60, 61, which are driven by individual motors, not shown, can pivot about vertical axes 63, 64, respectively. Each of the wheels can be angularly adjusted about said axis by means of an individual worm wheel sector 65, 66 and worm 67, 68. The worms are driven by a steering gear 69 arranged automatically to maintain such a relation between the angles of deflection of the wheels 60, 61 that the point of intersection T between the wheel axe extensions Y, Z is always located in the vertical plane through the geometrical axis of the wheel 59. A pair of measuring wheels 70, 71 are provided at either side of the supporting wheel 59. The central axes of the measuring wheels coincide with, or are located in the vertical plane through, the geometrical axis 62 of the supporting wheel 59. Each one of the measuring wheels drives one measuring signal generator 72, 73. The output signals of said generators are supplied to a comparator U, which serves as a control unit for the steering gear 69, that is, generates the control signals required for the operation of the same. The operation of the comparator U corresponds to the one described above in connection with FIG. 3. When the axis of rotation of the carriage deviates from a predetermined point T, the comparator produces a (positive or negative) control signal causing the steering gear 69 to adjust the wheels 60, 61 in the direction required for restoring the axis of rotation of the carriage to the predetermined position.

I claim:

1. In a driverless carriage comprising
a carriage chassis,
at least three wheels for supporting said chassis,
motor means and transmission means for driving at least one of said wheels,
first bearing means for not more than two of said wheels, said first bearing means being arranged to define a single geometrical axis of said wheel or wheels which extends in a fixed horizontal direction with respect to the chassis,
second bearing means for the remaining at least one supporting wheel, said second bearing means being pivotably connected to the chassis to allow adjustment of the direction of said at least one supporting wheel with respect to the chassis and thus to enable the carriage to turn about a vertical slewing axis intersecting said single geometrical axis, and,
steering means for adjusting the position of said slewing axis with respect to the chassis,
the improvement comprising means for monitoring the position of said slewing axis including
at least one non-driven measuring wheel arranged to engage the surface supporting the carriage, said measuring wheel having a horizontal geometrical axis extending in the same vertical plane as said single geometrical axis, and,
signal generating means arranged to be operated by said at least one measuring wheel for generating a signal representing the rate of rotation of the measuring wheel,
said monitoring means being arranged to provide an output signal derived from the signal generated by said signal generating means so as to have a sign representing forward and backward movement respectively and a magnitude representing the rate of speed, with respect to the surface supporting the carriage, of a predetermined point of said single geometrical axis, said point defining a desired position of said slewing axis, and,
means controlled by said output signal for operating said steering means in such a way as to cause said steering means to adjust the slewing axis into said desired position.

2. In a carriage as claimed in claim 1 provided with two measuring wheels, the further improvement comprising
a registering meter arranged to receive the signals transmitted during a turning operation by the signal generating means operatively connected with at least one of said measuring wheels and to compute therefrom a quantity representing the angle of rotation of the carriage resulting from said turning operation, and,
means for comparing said computed quantity with a preset quantity representing a predetermined change of direction of the chassis.

3. In a carriage as claimed in claim 1, the further improvement comprising,
a registering meter arranged to receive the signals transmitted during the passage of the carriage from one location to another by said signal generating means and to compute therefrom a quantity representing the distance travelled by the carriage during said passage, and,
means for comparing said computed quantity with a preset quantity representing a predetermined distance.

4. In a carriage as claimed in claim 2, the further improvement comprising,
a registering meter arranged to receive the signals transmitted during the passage of the carriage from one location to another by the signal generating means operatively connected with at least one of said measuring wheels and to compute therefrom a quantity representing the distance travelled by the carriage during said passage, and,
means for comparing said computed quantity with a preset quantity representing a predetermined distance.

5. A carriage as claimed in claim 2 in which said non-driven measuring wheels also constitute two of said at least three supporting wheels.

6. In a driverless carriage comprising
a carriage chassis,
at least three wheels for supporting said chassis,
motor means and transmission means for driving at least one of said wheels, first bearing means for not more than two of said wheels, said first bearing means being arranged to define a single geometrical axis of said wheel or wheels which extends in a fixed horizontal direction with respect to the chassis, second bearing means for the remaining at least one supporting wheel, said second bearing means being pivotably connected to the chassis to allow adjustment of the direction of said at least one supporting wheel with respect to the chassis and thus to enable the chassis to turn about a vertical slewing axis intersecting said single geometrical axis, and, steering means for adjusting the position of said slewing axis with respect to the chassis, the improvement comprising two non-driven measuring wheels of equal diameters having a common horizontal geometrical axis extending in the vertical plane through said single geometrical axis, two signal generators each of which is operated by one of said measuring wheels to provide a signal representing the rate of rotation of the measuring wheel, means for comparing said signals and for producing an output signal representing the difference between the rates of rotation of said measuring wheels, and means controlled by said output signal for adjusting said steering means towards a setting rendering the rates of rotation of the measuring means equal.

* * * * *